United States Patent
Shaked et al.

(10) Patent No.: US 12,242,601 B2
(45) Date of Patent: Mar. 4, 2025

(54) SYSTEM AND METHOD FOR AGENTLESS HOST CONFIGURATION DETECTION IN A COMPUTING ENVIRONMENT

(71) Applicant: Wiz, Inc., New York, NY (US)

(72) Inventors: Yaniv Shaked, Tel Aviv (IL); Mattan Shalev, Tel Aviv (IL); Gal Kozoshnik, Petah Tikva (IL); Daniel Klein, Tel Aviv (IL); Roy Reznik, Tel Aviv (IL); Ami Luttwak, Binyamina (IL)

(73) Assignee: Wiz, Inc., New York, NY (US)

( * ) Notice: Subject to any disclaimer, the term of this patent is extended or adjusted under 35 U.S.C. 154(b) by 303 days.

(21) Appl. No.: 17/930,552

(22) Filed: Sep. 8, 2022

(65) Prior Publication Data

US 2024/0086524 A1    Mar. 14, 2024

(51) Int. Cl.
*G06F 21/55* (2013.01)
*G06F 21/53* (2013.01)
*G06F 21/57* (2013.01)

(52) U.S. Cl.
CPC ...... *G06F 21/554* (2013.01); *G06F 2221/034* (2013.01)

(58) Field of Classification Search
CPC .. G06F 21/554; G06F 2221/034; G06F 21/53; G06F 21/577
See application file for complete search history.

(56) References Cited

U.S. PATENT DOCUMENTS

| | | | |
|---|---|---|---|
| 9,195,573 B1 * | 11/2015 | Giammaria | G06F 11/3688 |
| 9,800,603 B1 | 10/2017 | Sidagni | |
| 10,581,690 B2 | 3/2020 | Salgueiro et al. | |
| 11,018,948 B2 | 5/2021 | Subramanian et al. | |
| 2015/0058461 A1 * | 2/2015 | Guiditta | H04L 41/0843 709/223 |
| 2017/0041349 A1 | 2/2017 | Ylonen | |
| 2017/0147324 A1 * | 5/2017 | Weber | G06F 8/656 |
| 2018/0332005 A1 * | 11/2018 | Ettema | H04L 63/0227 |
| 2019/0171770 A1 * | 6/2019 | Walker | G06F 40/154 |
| 2022/0215088 A1 * | 7/2022 | Kosaka | G06F 9/455 |
| 2023/0164164 A1 * | 5/2023 | Herzberg | G06F 21/53 726/1 |
| 2023/0177192 A1 * | 6/2023 | Magen | G06F 21/53 726/28 |

* cited by examiner

*Primary Examiner* — Darren B Schwartz
(74) *Attorney, Agent, or Firm* — M&B IP Analysts, LLC

(57) ABSTRACT

A system and method for evaluating definitions from a markup language document for agentless host configuration includes generating an inspectable disk based on a disk of a host, the host deployed in a virtualized computing environment. The system is configured to: receive a markup language document, the markup language document including a plurality of definitions, each definition including a data element; inspect the inspectable disk for a cybersecurity object corresponding to a first data element of a first definition of the plurality of definitions; evaluate the first definition further based on the cybersecurity object to generate an evaluated first definition result, in response to determining that the definition is evaluable; generate an output based on the evaluated first definition result; and generate the output based on a predetermined notification, in response to determining that the definition is unevaluable.

19 Claims, 4 Drawing Sheets

SYSTEM AND METHOD FOR AGENTLESS HOST CONFIGURATION DETECTION IN A COMPUTING ENVIRONMENT

TECHNICAL FIELD

The present disclosure relates generally to cybersecurity and in particular to performing disk inspection for vulnerability assessment of disks in a cloud computing environment.

BACKGROUND

Computer systems are at the heart of nearly every human activity today. Critical infrastructure, such as power plants, air traffic control, banking, etc., are all built upon interconnected networks. Many of these computer systems have been migrated to cloud computing environments, and run on infrastructure such as provided by Microsoft® Azure, Amazon® Web Services (AWS), Google® Cloud Platform (GCP), and the like.

Time and time again, these systems prove not to be infallible. Computer systems are open to vulnerabilities, and due to the distributed and global nature of their deployment, especially in cloud computing, can occur at anytime and anywhere. As such, it is useful to have a standard by which different commercial organizations, governments, and individuals, can convey information about the exposure and vulnerability status of different computer systems.

For example, the Common Vulnerabilities and Exposures (CVE) database catalogs cybersecurity vulnerabilities and exposures and provides unique vulnerabilities with an identification record by which they can be referenced, leading to some standardization in addressing such vulnerabilities.

As another example, the Open Vulnerability and Assessment Language (OVAL®) is computer language for encoding computer system details using schemas defined by members of the OVAL community. There are currently three main schemas which are used for representing configuration information of a tested system, analyzing the system to detect a specific machine state, and reporting the result of the analysis.

OVAL documents may be implemented using a markup language, such as Extensible Configuration Checklist Description Format (XCCDF), or other XML-based formats, for example. An OVAL document specifies, for example, certain checks to perform on a machine, such as a virtual machine, container, and the like.

The OVAL document is provided to an interpreter which evaluates the definitions listed in the OVAL document against a state of a machine, and returns a result. In order to determine a state of the machine, the machine needs to be accessed in some way. For example, agent based solutions require an agent installed on a machine which supplies the interpreter with information about different states of the machine. An agent is a software application that resides on a machine, and requires memory and processor use, which are resources which are not being used by the machine for its intended purpose.

It would therefore be advantageous to provide a solution that would overcome the challenges noted above, such as reducing the memory use, processor user, or both, while performing an inspection based off of an OVAL document.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for evaluating definitions from a markup language document for agentless host configuration. The method comprises: generating an instruction to generate an inspectable disk based on a disk of a host, the host deployed in a virtualized computing environment; receiving a markup language document, the markup language document including a plurality of definitions, each definition including a data element; inspecting the inspectable disk for a cybersecurity object corresponding to a first data element of a first definition of the plurality of definitions; evaluating the first definition further based on the cybersecurity object to generate an evaluated first definition result, in response to determining that the definition is evaluable; generating an output based on the evaluated first definition result; and generating the output based on a predetermined notification, in response to determining that the definition is unevaluable.

Certain embodiments disclosed herein also include a non-transitory computer readable medium having stored thereon causing a processing circuitry to execute a process, the process comprising: generating an instruction to generate an inspectable disk based on a disk of a host, the host deployed in a virtualized computing environment; receiving a markup language document, the markup language document including a plurality of definitions, each definition including a data element; inspecting the inspectable disk for a cybersecurity object corresponding to a first data element of a first definition of the plurality of definitions; evaluating the first definition further based on the cybersecurity object to generate an evaluated first definition result, in response to determining that the definition is evaluable; generating an output based on the evaluated first definition result; and generating the output based on a predetermined notification, in response to determining that the definition is unevaluable.

Certain embodiments disclosed herein also include a system for evaluating definitions from a markup language document for agentless host configuration. The system comprises: a processing circuitry; and a memory, the memory containing instructions that, when executed by the processing circuitry, configure the system to: generate an instruction to generate an inspectable disk based on a disk of a host, the host deployed in a virtualized computing environment; receive a markup language document, the markup language document including a plurality of definitions, each definition including a data element; inspect the inspectable disk for a cybersecurity object corresponding to a first data element of a first definition of the plurality of definitions; evaluate the first definition further based on the cybersecurity object to generate an evaluated first definition result, in response to determining that the definition is evaluable; generate an output based on the evaluated first definition result; and generate the output based on a predetermined notification, in response to determining that the definition is unevaluable.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1 is a network diagram of a cloud computing environment and an inspection environment, utilized to describe an embodiment.

DETAILED DESCRIPTION

Figure 1:
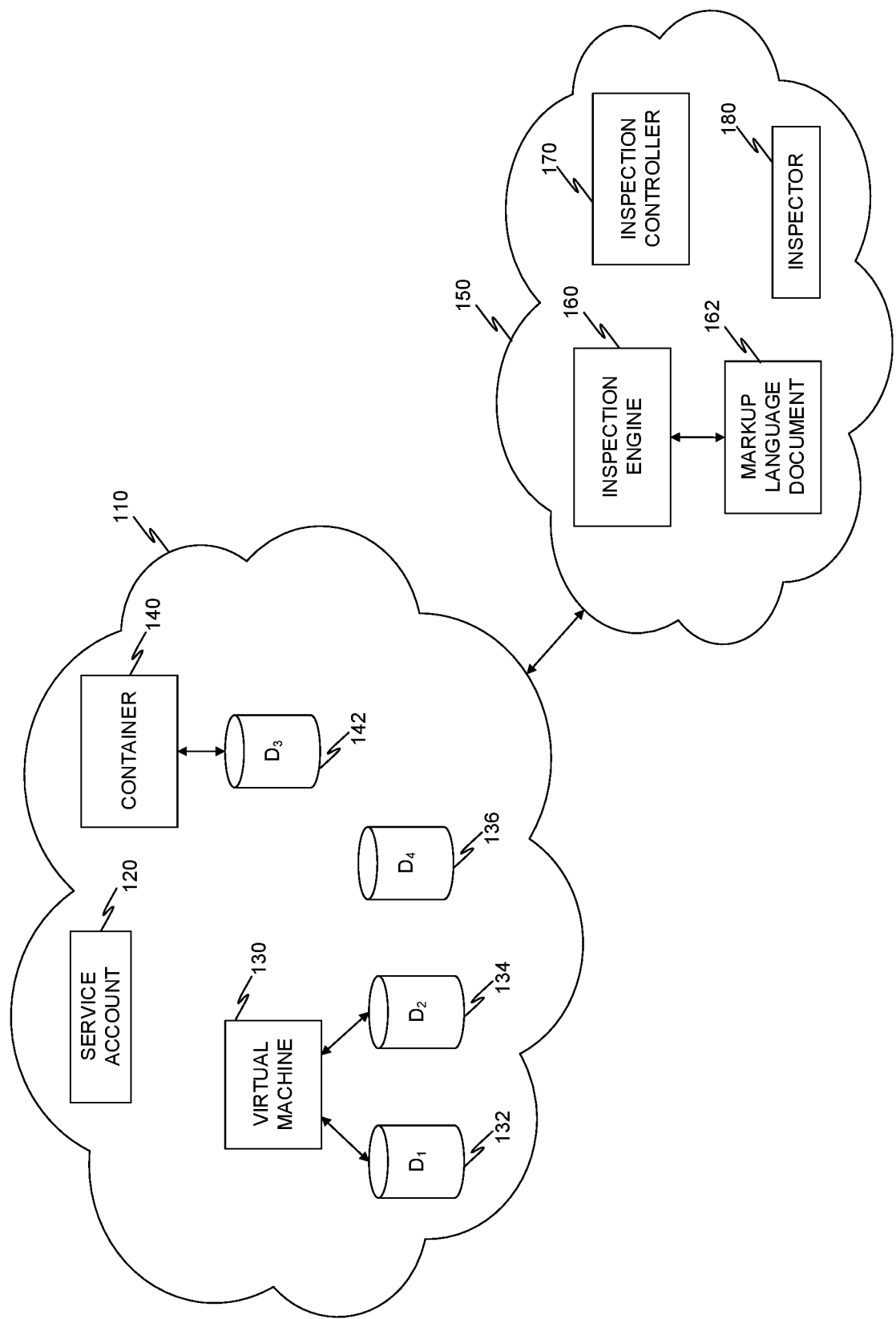

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for agentless host configuration detection. In an embodiment, a system is configured to receive a markup language document which is generated based on a data schema for representing system information, and a data schema for representing a specific machine state. The system is further configured to generate an output based on a data schema for reporting. The markup language document includes a definition. A definition includes a logical expression for determining whether a cybersecurity risk, such as a software vulnerability, a misconfiguration, an application, a patch, an update, and the like, are present on the system (also referred to as host) being tested. A rule may be, for example, "version of software X is 12.24". The system may be configured to perform a check, for example, by parsing the rule to detect rule elements, generating instructions for an inspector to extract certain information pertaining to each rule element, and then performing a comparison between the extracted data and the value of a rule element.

For example, in an embodiment the system is configured to parse the above rule and detect the term "software", which is a data element, having a value "X". The system may then configure an inspector workload to extract from an inspected machine data pertaining to a software version of an application having a file stored on a disk of the inspected machine. For example, the application may be stored in a "\thin\software\" directory in the filesystem of the inspected machine. A version of the application may be extracted from the directory, for example by inspecting a fie name of an executable file of the application. The version of the application may then be compared to the version of the definition, to determine if the result of the definition is true or false.

In certain embodiments, the system is configured to determine, for each definition, whether an output can be generated based on the definition and a type of data which can be extracted from a disk. For example, certain data can only be extracted by accessing a machine at run time, such as data used by the kernel of the operating system of the machine. For example, kernel data may include information such as identifiers of processes currently running on the machine.

Therefore, if a definition requires data which is not extractable from the disk, the system may provide an output stating that a test based on the definition (i.e., evaluating the definition) was not performed, is not supported, and the like. This is an improvement over a solution which would terminate if a test were not possible to perform, as the disclosed system is configured to provide information which is not otherwise available.

It should be noted a human operator is incapable of performing the task of applying definitions repeatedly in a reliable manner, applying conditions of a definition equally to achieve an exact same result based on the same input, over time. In other words, a human operator may apply subjective criteria when making determinations, as such is the nature of the human brain. Applying subjective criteria inevitably leads to errors, which are undesirable. Furthermore, a human cannot practically perform such tasks, as each disk may be checked against hundreds of definitions, each host may contain multiple disks, and each computing environment may contain hundreds, sometimes thousands, of hosts, each of which need to be inspected. As such, the number of evaluations required to be performed far exceeds the capability of a human operator, and prevents a human operator from being able to perform the task in a relevant time frame.

The disclosed embodiments solve at least this problem by providing a solution which applies definitions equally and reliably to all inspectable disks, utilizing objective criteria provided by the definitions. The embodiments utilize an inspectable disk, which is a disk generated based on a disk of a host, and is not the disk of the host. By performing the evaluation of definition on the inspectable disk, access to the host and disk of the host is lowered. The embodiments disclose an agentless solution, which does not require an agent to be installed on the inspected host. By circumventing the need to install an agent, memory and processor resources of the host are not diverted to running an agent software, thereby allowing the host to utilize the memory and processor resources to perform tasks of the host.

FIG. 1 is an example of a network diagram of a cloud computing environment and an inspection environment, utilized to describe an embodiment. A cloud computing environment 110 is deployed on a cloud computing infrastructure, such as provided by Amazon® Web Services (AWS), Microsoft® Azure, Google® Cloud Platform (GCP) and the like. In an embodiment, a cloud computing environment 110 is deployed, for example, as a virtual private cloud (VPC), a virtual network (VNet), and the like. In an embodiment, the cloud computing environment 110 is deployed utilizing a plurality of cloud computing environments, each provided by a different cloud computing infrastructure. While a cloud computing environment is discussed as an example, the teachings herein can be applied to computing environments, virtualized environments, network environments, and the like, without departing from the scope of this disclosure.

The cloud computing environment 110 includes a plurality of cloud entities. In an embodiment a cloud entity includes a resource, a principal, and the like. A resource is a cloud entity which provides access to (i.e., exposes) a compute resource, such as a storage, a processor, a memory, a combination thereof, and the like. In some embodiments, a resource is provided as infrastructure as a service (IaaS), platform as a service (PaaS), software as a service (SaaS), a combination thereof, and the like. For example, a resource may be a software application, such as a web gateway, a web application firewall (WAF), a proxy server, a web server, and the like. In some embodiments, a resource is deployed as a virtual machine, a container, a serverless function, and the like.

A principal is a cloud entity that is authorized to initiate an action in a cloud computing environment, act on a resource, and the like. In some embodiments, a resource may be a principal respective of another resource. In an embodiment, a principal is a user account, a service account, a role, and the like.

In an embodiment, the cloud computing environment 110 includes a service account 120, a virtual machine 130, and a container 140. This example embodiment utilizes a service account 120, however not all cloud computing infrastructure providers utilize a principal called a service account. In some platforms there is no distinction between a user account and a service account, while in others these are handled as different types of identities. For the purpose of this example, a service account 120 is utilized, however this should not be seen as limiting in any way, and is merely presented here for pedagogical purposes. In other embodiments, other suitable identities, for example managed by an identity access management service, are utilized without departing from the scope of this disclosure. The service account 120 provides permissions for an inspection environment 150 to access the cloud computing environment 110.

A virtual machine 130 utilizes a first disk 132 and a second disk 134. In an embodiment, the virtual machine 130 is mounted on the first disk 132, which stores thereon an operating system (OS), an application, binaries, libraries, and the like. In an embodiment, the second disk 134 is a data disk which includes data, which may be structured, unstructured, a combination thereof, and the like. For example, the second disk 134 may store thereon files, folders, and the like, based on a filesystem. A virtual machine 130 may be, for example, Oracle® VirtualBox®.

A container 140 utilizes a third disk 142. A container 140 may be deployed using, for example, a Docker® Engine, a Kubernetes® Engine, and the like. A container 140 may utilize the third disk 142 for storing, for example, binaries, libraries, and the like, of an application deployed on the container 140. A container 140 may utilize a disk, for example by creating a persistent volume claim (PVC) on the third disk 142.

An inspection environment 150 is communicatively coupled with the cloud computing environment 110. In an embodiment, the inspection environment is deployed as a VPC, VNet, and the like, on a cloud computing infrastructure, such as AWS, Azure, GCP, a combination thereof, and the like.

In certain embodiments, the inspection environment 150 includes an inspection engine 160 which is configured to read markup language documents, such as markup language document 162, an inspection controller 170, and an inspector 180. An example of an inspection environment 150 is discussed in more detail in U.S. Non-Provisional patent application Ser. No. 17/532,557, assigned to common assignee, the entire contents of which are hereby incorporated by reference. An inspection controller 170 is configured to initiate inspection of a workload in the cloud computing environment 110. An inspection controller 170 may be implemented, for example, as a virtual machine, software container, serverless function, a combination thereof, and the like. A workload may be, for example, the virtual machine 130, the container 140, and the like. In an embodiment, an inspection controller 170 is configured to select workloads from the cloud computing environment 110 for inspection based on a list of identifiers. The list may be stored, for example in the inspection environment 150, as a table on a database, wherein the database includes a column with which a unique identifier of a workload may be determined, such as a network address, VPC name, name from a namespace, a combination thereof, and the like.

In certain embodiments, the inspection controller 170 is configured to initiate generation of an inspectable disk 136. In an embodiment, an inspectable disk 136 is generated by copying, duplicating, cloning, and the like, of a disk, such as first disk 132. In some embodiments, the inspection controller 170 is configured to generate the inspectable disk 136 utilizing the service account 120 to initiate actions in the cloud computing environment 110. In some embodiments, the inspection controller 170 is configured to associate the inspectable disk 136 with an inspector 180, for example by initiating a persistent volume claim (PVC) between the inspectable disk 136 and the inspector 180. This allows the inspector 180 to access the inspectable disk 136 and inspect it for cybersecurity objects.

In an embodiment a cybersecurity object is any one of: a secret, a password stored in plaintext, a password stored in cleartext, a weak password, a certificate, a private key, a public key, a registry file, a file, a folder, a malware object, a code object, an application, an operating system, and the like. In an embodiment, a cybersecurity threat is determined based on the detected cybersecurity object. For example, a database application may be detected, which is not password protected. This is a misconfiguration, and is a type of cybersecurity threat as unauthorized access to the database application may be possible.

In certain embodiments, an inspection engine 160 is configured to receive a markup language document 162 including a plurality of definitions and apply at least a portion of the plurality of definitions on the inspectable disk 136. In an embodiment, applying a definition on an inspectable disk 136 includes configuring an inspector 180 to extract a cybersecurity object from the inspectable disk 136, and determining, based on the extracted cybersecurity object, if the definition results in a true or false state.

In the example above, the cybersecurity object is a software version number, and the definition is evaluated by determining if the software version number of the software application is equal to the value provided by the definition. This evaluation is either true or false.

In an embodiment, the markup language document 162 includes extensible markup language (XML) code, Extensible Configuration Checklist Description Format (XCCDF) code, and the like. In some embodiments, a plurality of markup language documents are applied on the inspectable disk 136. In certain embodiments, the inspection engine 160 is configured to determine if a definition can be applied to an inspectable disk. In certain embodiments, the inspection engine 160 is configured to predetermine if a definition can be applied to an inspectable disk 136. In such embodiments, a definition which cannot be applied, for example due to requiring data stored in a kernel space of an inspected machine, is not evaluated as part of applying the markup language document 162 on the inspectable disk 136.

This is advantageous as processing resources are not wasted in an attempt to evaluate a definition which is not possible to evaluate based on the inspectable disk 136 alone. Furthermore, this allows evaluating the definitions which can be evaluated, thereby providing some result which can be used to determine a cybersecurity state of an inspected machine. In an embodiment where the inspectable disk 136 is a copy of the first disk 132, the inspected machine is the virtual machine 130.

Figure 2:
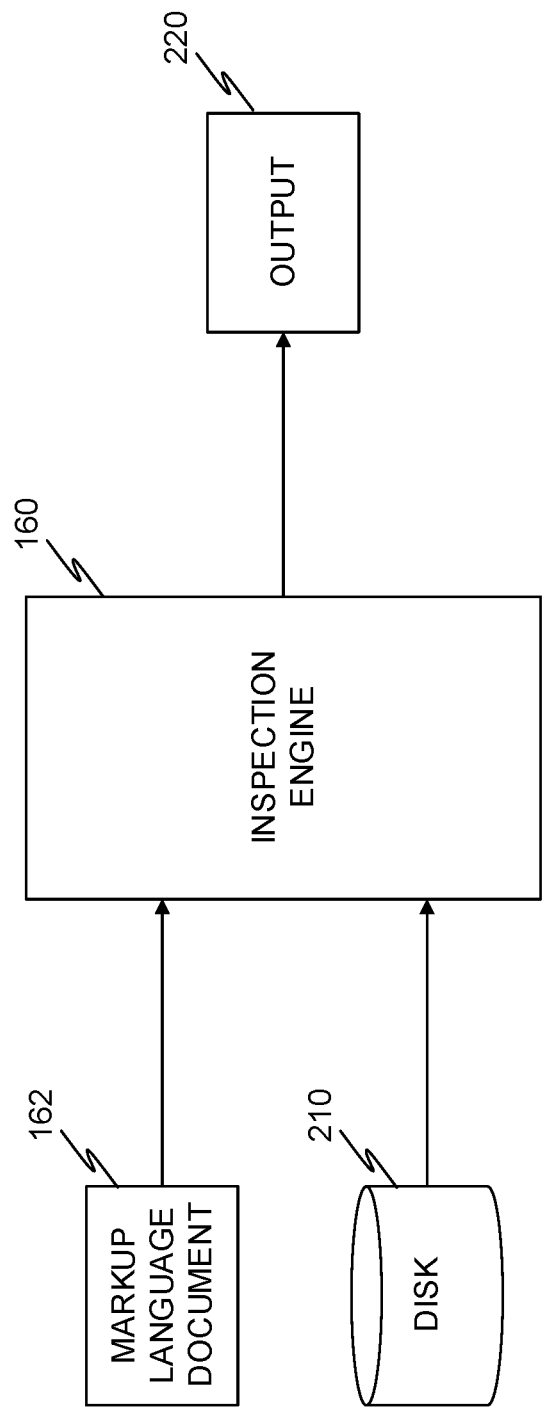
FIG. 2 is a schematic illustration of an inspection engine flow from input to output, utilized to describe an embodiment.

FIG. 2 is an example of a schematic illustration of an inspection engine flow from input to output, utilized to describe an embodiment. In an embodiment, an inspection engine 160 is implemented as a virtual machine, a software container, a serverless function, a combination thereof, and the like. In certain embodiments, the inspection engine 160 is configured to receive as an input a markup language document 162, and is further provided access to an inspectable disk 210.

The markup language document 162 includes a plurality of definitions. Each definition is an expression which is evaluated based on an input which is generated from an inspectable disk. An example of a definition is "All USERS having ADMIN privilege are THREE MONTHS or older". In this example, an evaluation is performed to determine if all user accounts which have administrator privilege (i.e., access) are older than three months. A new administrator account may be an indication of a cybersecurity breach, as an attacker is motivated to gain such privilege, which allows the attacker to subvert resources of a cloud computing environment to their own purposes. This is obviously undesirable for the owner of the cloud computing environment.

In an embodiment, evaluating a definition includes parsing the definition to detect a data element, and detect a corresponding data value. In the previous example, the data element "privilege" has a value of "ADMIN". In certain embodiments, the inspection engine 160 is configured to detect data elements from a definition, for example based on a list of predetermined data elements. In some embodiments, the inspection engine 160 is configured to detect data values by parsing a definition and searching for predetermined data types, such as strings, integers, and the like. For example, the data element "privilege" may include a closed list of predetermined privileges.

In some embodiments, providing the inspection engine 160 access to an inspectable disk 210 includes configuring an inspector to extract a cybersecurity object from the inspectable disk 210, and provide the cybersecurity object, a value pertaining to the cybersecurity object, and the like. In certain embodiments, the inspection engine 160 is configured to request from an inspector a cybersecurity object, a value pertaining to the cybersecurity object, and the like.

The inspection engine 160 is configured to generate an output 220 based on evaluating a definition. In some embodiments, the inspection engine 160 is further configured to generate an output 220 based on a definition that is not evaluable. For example, if a definition cannot be evaluated based on data extracted from an inspectable disk 210, the inspection engine 160 is configured, in an embodiment, to generate an output 220 which indicates that the definition evaluation was not performed, is not supported, a combination thereof, and the like.

In some embodiments, the inspection engine 160 is configured to generate an output 220 based on successful evaluation of a definition. A successful evaluation of a definition results in either a true or a false value. In an embodiment, the output 220 is generated based on the definition, an identifier of the definition, an evaluation result, a combination thereof, and the like. For example, an output 220 may be "Definition number ONE is TRUE", "Definition number TWO is FALSE", etc. As another example, the output 220 may be "Definition ADMIN USERS is TRUE", where "ADMIN USERS" is an identifier (e.g., name) of a definition, such as the definition presented above to determine age of administrator accounts.

Figure 3:
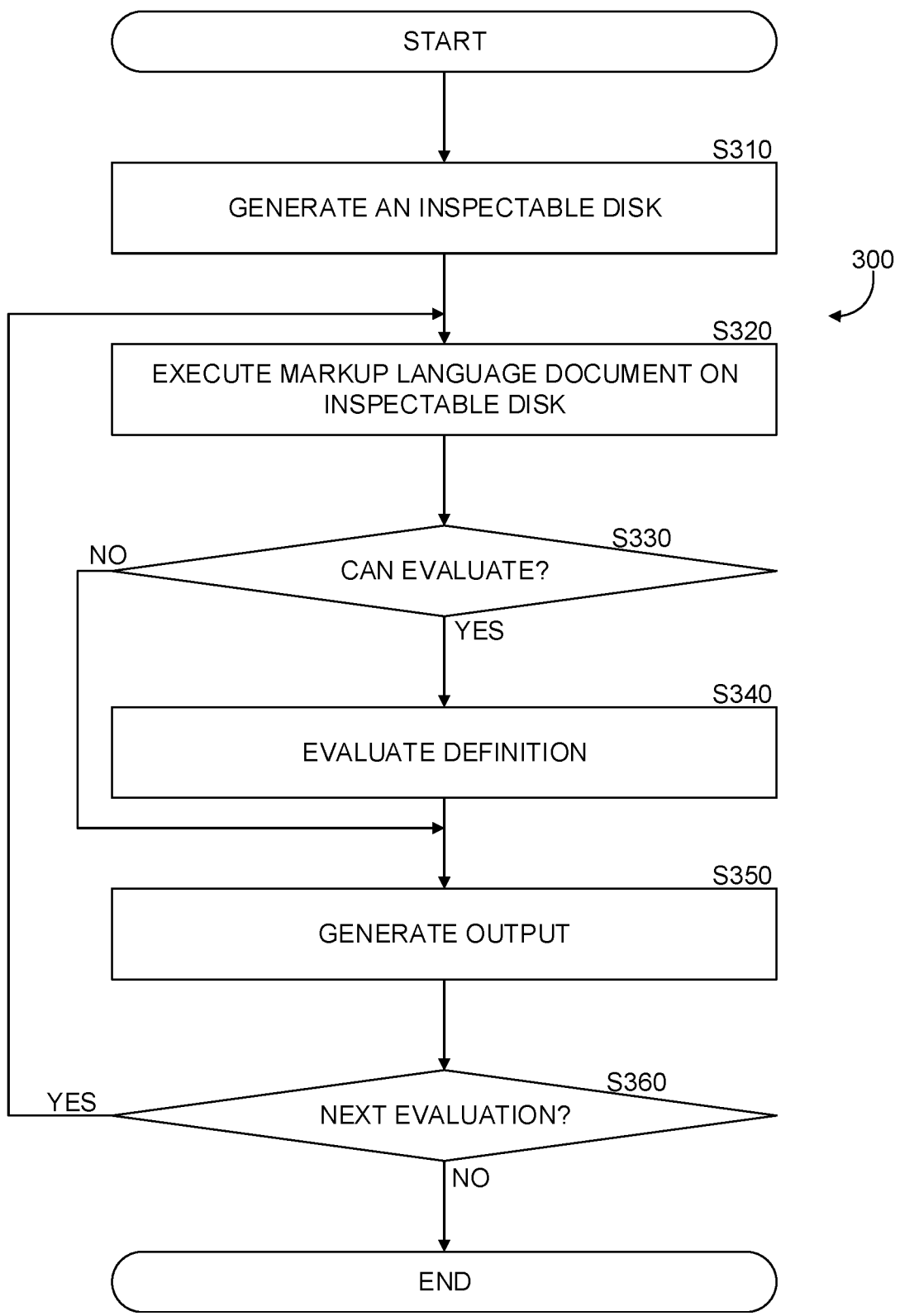
FIG. 3 is a flowchart of a method for evaluating definitions in a markup language document, implemented in accordance with an embodiment.

FIG. 3 is an example of a flowchart 300 of a method for evaluating definitions in a markup language document, implemented in accordance with an embodiment. In an embodiment, evaluating definition of a markup language document is performed to detect host configuration of a machine in an agentless manner. Host configuration refers to a set of attributes which are used to define a machine, such as a virtual machine, software container, serverless function, and the like. The attributes may be, for example, an operating system (OS) type, OS version, application type, application version, network configuration, combinations thereof, and the like. Host configuration is performed in an agentless manner utilizing the method described in more detail herein. An agentless solution is advantageous as it provides the ability to execute at least a portion of definitions from a markup language document, while utilizing less compute resources of the host (i.e., the inspected machine) than an agent installed on the host would. Compute resources may be, for example, a processor, a memory, a storage, a combination thereof, and the like. The method may be performed, for example, by an inspection engine 160.

At S310, an inspectable disk is generated. In an embodiment, generating an inspectable disk includes generating an instruction, which when executed in a cloud computing environment generates a disk which is inspectable. For example, the instruction may be executed by an orchestrator of a cloud computing environment, and cause provisioning of resources an inspectable disk is a disk which is accessible, for example, by an inspector which is configured to detect thereon a cybersecurity object. In an embodiment, an inspectable disk is generated by generating an instruction to clone, copy, duplicate, and the like, a disk associated with a machine which is inspected. In some embodiments, the inspectable disk is associated with an inspection engine, an inspector, and the like. For example, an inspectable disk is associated with an inspector by providing the inspector with a persistent volume claim on the inspectable disk.

At S320, a markup language document is executed on the inspectable disk. In an embodiment, the markup language document includes a plurality of definitions. In certain embodiments, an instruction is generated which when executed results in a plurality of markup language documents executed on the inspectable disk. A markup language document includes a plurality of definitions. In an embodiment, executing a markup language document includes evaluating a definition. Each definition is evaluated, for example based on a cybersecurity object extracted by an inspector from the inspectable disk, and a result is generated. In an embodiment, a definition includes a data element, a value of the data element, a combination thereof, and the like. In some embodiments, a definition includes a plurality of data elements.

At S330, a check is performed to determine if a first definition of a plurality of definitions of the markup language document, is evaluable. An evaluable definition is a definition which can be evaluated based on the access to the inspected disk. For example, a definition requiring runtime data is not evaluable (unevaluable). If the definition can be evaluated based on data extracted from the inspectable disk, execution continues at S340. If the definition cannot be evaluated based on data extracted from the inspectable disk, execution continues at S350.

In certain embodiments, the check is performed based on a data element of the definition. For example, a data element of the definition may be predetermined to be unevaluable. In some embodiments, the check is performed against a list of predetermined unevaluable data elements. For example, a definition is parsed, a data element is detected, and the data element is compared to other data elements of a list of predetermined unevaluable data elements. If the data element matches a data element from the list of predetermined unevaluable data elements, then the definition is not evaluated and execution continues at S350. If the data element does not match a data element from the list of predetermined unevaluable data elements, then execution continues at S340.

At S340, a definition of the markup language document is evaluated. In an embodiment, evaluating the definition includes generating an instruction for an inspector to extract data, such as a cybersecurity object, cybersecurity object value, and the like, and comparing the extracted data to a data value associated with a data element from the definition. In certain embodiments, a definition is parsed to detect data elements, data values, combinations thereof, and the like. For example, a definition is parsed to detect predetermined data element identifiers.

At S350, an output is generated. In an embodiment, the output is generated based on any one of: the definition, an identifier of the definition, a data element of the definition, a result of evaluating the definition, a result of the check of S330, a combination thereof, and the like. For example, an output may be a true value, or a false value, which is determined based on evaluating the definition, and further based on an extracted cybersecurity object.

The definition is, in an embodiment, a logical expression which includes a condition on a data element. Where the condition is satisfied, the result of evaluating the definition is, for example, "true" or "false". An example of a definition is "All USERS having ADMIN privilege are THREE MONTHS or older" An output based on evaluating the definition may be "Definition number ONE is TRUE", "Definition number TWO is FALSE", etc. As another example, the output may be "Definition ADMIN USERS is TRUE", where "ADMIN USERS" is an identifier of the definition.

In the above example, an inspector is configured, in an embodiment, to detect user accounts on a disk. A user account may be stored on a disk for example, as a collection of files. For example, files for a specific user account may be stored in a file path "usr/admin/", "usr/daniel", "usr/jonathan", "usr/tom", and the like, each path indicating a different user. Privileges associated with a user account, for example in a Linux® based operating system are stored as an index node, which can be accessed by an inspector to determine which of the above user accounts have administrator privileges. The age of an account may be determined, for example, by determining the creation date of the index node, which is stored as metadata on the inspectable disk.

As another example, an output may be a notification that a definition is unevaluable, for example based on the check performed at S330. In certain embodiments, an output is generated which includes a report, the report further including a result for each definition which is evaluable, and a notification indicating that the definition is unevaluable, for each definition which is unevaluable.

At S360, a check is performed to determine if another definition should be evaluated. If 'yes' execution continues at S320. In an embodiment, the another definition is received from a new markup language document. In some embodiments, the another definition is the next definition from a markup language document including a plurality of definitions. If 'no', execution terminates.

In some embodiments, an instruction to perform a mitigation action may be generated, in response to detecting that the machine of the inspectable disk has failed a predetermined number of definitions. In an embodiment, failing a definition is determined based on the definition and the definition result. For example, for some definitions, a failure corresponds to a true result in response to evaluating the definition, while for other definitions a failure corresponds to a false result in response to evaluating the definition.

In certain embodiments, a mitigation action includes generating a notification that the machine has failed a definition of the markup language document, failed the markup language document entirely, and the like. In some embodiments, a mitigation action includes generating an instruction that when executed configures an inspector to inspect the machine for further cybersecurity threats. For example, failing to reach a predetermined number of definitions results in an inspector being configured to inspect the inspectable disk for a malware object.

Figure 4:
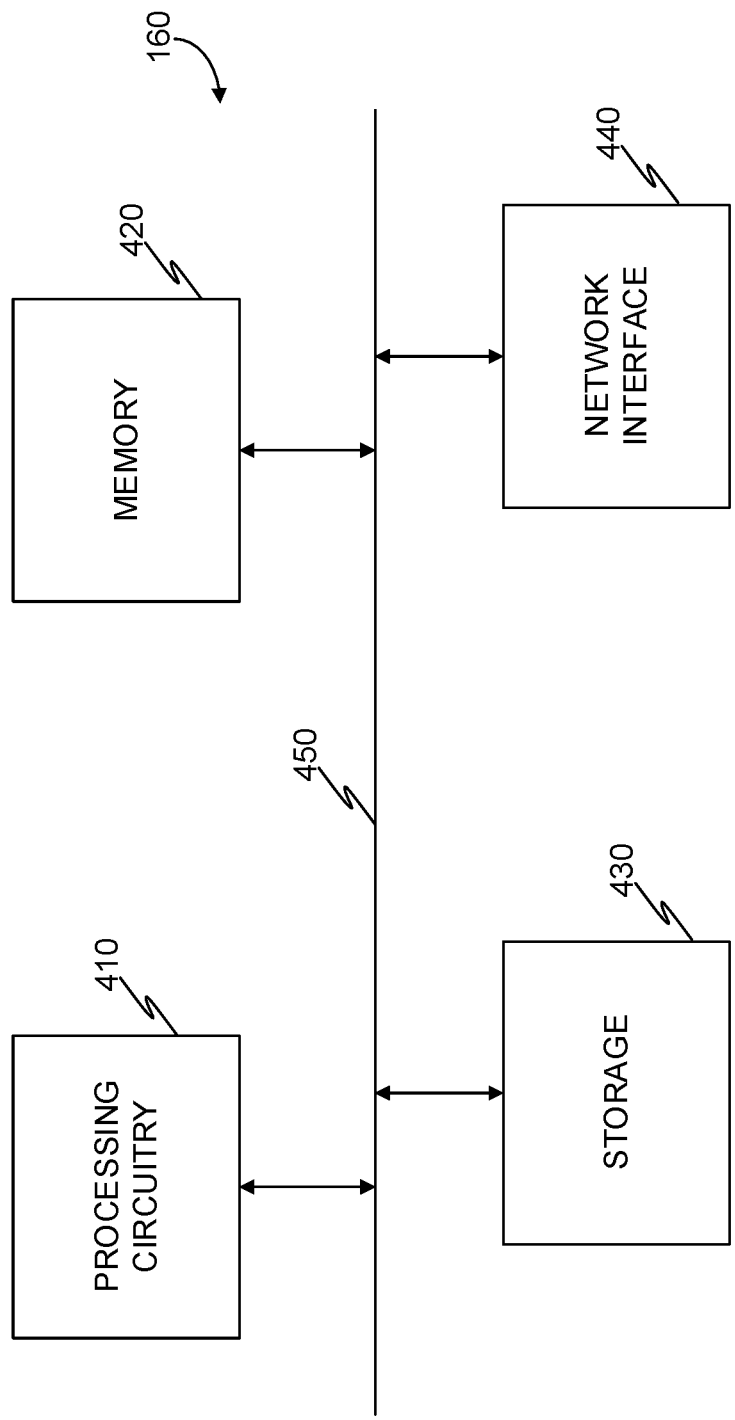
FIG. 4 is a schematic diagram of an inspection engine according to an embodiment.

FIG. 4 is an example schematic diagram of an inspection engine 160 according to an embodiment. The inspection engine 160 includes a processing circuitry 410 coupled to a memory 420, a storage 430, and a network interface 440. In an embodiment, the components of the inspection engine 160 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inspection engine 160 to communicate with, for example, an inspector 180, an inspection controller 170, and the like.

It should be understood that the embodiments described herein are not limited to the specific architecture illustrated in FIG. 4, and other architectures may be equally used without departing from the scope of the disclosed embodiments.

Furthermore, in certain embodiments the inspector 180, inspection controller 170, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for evaluating definitions from a markup language document for agentless host configuration, comprising:

generating an instruction to generate an inspectable disk based on a disk of a host, the host deployed in a virtualized computing environment;

receiving a markup language document, the markup language document including a plurality of definitions, each definition including a data element;

inspecting the inspectable disk for a cybersecurity object corresponding to a first data element of a first definition of the plurality of definitions;

evaluating via an inspection engine deployed in the virtualized computing environment the first definition further based on the cybersecurity object to generate an evaluated first definition result, in response to determining that the definition is evaluable;

generating an output based on the evaluated first definition result; and generating the output based on a predetermined notification, in response to determining that the definition is unevaluable.

2. The method of claim 1, further comprising:
generating an instruction which when executed generates a persistent volume claim (PVC) between the inspectable disk an inspector.

3. The method of claim 1, further comprising:
generating the inspectable disk based on any one of: a clone, a duplicate, and a copy, of the disk of the host.

4. The method of claim 1, further comprising:
parsing the first definition to detect the first data element.

5. The method of claim 4, further comprising:
parsing the first definition to further detect a first data value corresponding to the first data element.

6. The method of claim 1, further comprising:
inspecting the inspectable disk for a cybersecurity object value of the cybersecurity object.

7. The method of claim 1, further comprising:
evaluating the definition to be either true or false, based on the cybersecurity object.

8. The method of claim 1, wherein the predetermined notification includes an indication that the definition is unevaluable.

9. The method of claim 1, further comprising:
generating an instruction to perform a mitigation action, in response to determining that the host has failed a predetermined number of definitions.

10. A non-transitory computer readable medium having stored thereon instructions for causing a processing circuitry to execute a process, the process comprising:

generating an instruction to generate an inspectable disk based on a disk of a host, the host deployed in a virtualized computing environment;

receiving a markup language document, the markup language document including a plurality of definitions, each definition including a data element;

inspecting the inspectable disk for a cybersecurity object corresponding to a first data element of a first definition of the plurality of definitions;

evaluating via an inspection engine deployed in the virtualized computing environment the first definition further based on the cybersecurity object to generate an evaluated first definition result, in response to determining that the definition is evaluable;

generating an output based on the evaluated first definition result; and generating the output based on a predetermined notification, in response to determining that the definition is unevaluable.

11. A system for evaluating definitions from a markup language document for agentless host configuration, comprising:
 a processing circuitry; and
 a memory, the memory containing instructions that, when executed by the processing circuitry, configure the system to:
 generate an instruction to generate an inspectable disk based on a disk of a host, the host deployed in a virtualized computing environment;
 receive a markup language document, the markup language document including a plurality of definitions, each definition including a data element;
 inspect the inspectable disk for a cybersecurity object corresponding to a first data element of a first definition of the plurality of definitions;
 evaluate via an inspection engine deployed in the virtualized computing environment the first definition further based on the cybersecurity object to generate an evaluated first definition result, in response to determining that the definition is evaluable;
 generate an output based on the evaluated first definition result; and
 generate the output based on a predetermined notification, in response to determining that the definition is unevaluable.

12. The system of claim 11, wherein the memory contains further instructions which, when executed by the processing circuitry, configure the system further to:
 generate an instruction which when executed generates a persistent volume claim (PVC) between the inspectable disk an inspector.

13. The system of claim 11, wherein the memory contains further instructions which, when executed by the processing circuitry, configure the system further to:
 generate the inspectable disk based on any one of: a clone, a duplicate, and a copy, of the disk of the host.

14. The system of claim 11, wherein the memory contains further instructions which, when executed by the processing circuitry, configure the system further to:
 parse the first definition to detect the first data element.

15. The system of claim 14, wherein the memory contains further instructions which, when executed by the processing circuitry, configure the system further to:
 parse the first definition to further detect a first data value corresponding to the first data element.

16. The system of claim 11, wherein the memory contains further instructions which, when executed by the processing circuitry, configure the system further to:
 inspect the inspectable disk for a cybersecurity object value of the cybersecurity object.

17. The system of claim 11, wherein the memory contains further instructions which, when executed by the processing circuitry, configure the system further to:
 evaluate the definition to be either true or false, based on the cybersecurity object.

18. The system of claim 11, wherein the predetermined notification includes an indication that the definition is unevaluable.

19. The system of claim 11, wherein the memory contains further instructions which, when executed by the processing circuitry, configure the system further to:
 generate an instruction to perform a mitigation action, in response to determining that the host has failed a predetermined number of definitions.

* * * * *